May 17, 1938.  W. G. MYLIUS  2,117,904
POLYPHASE DETACHABLE METER
Filed Nov. 21, 1935  3 Sheets-Sheet 1

WITNESSES:

INVENTOR
Walter G. Mylius.
BY
ATTORNEY

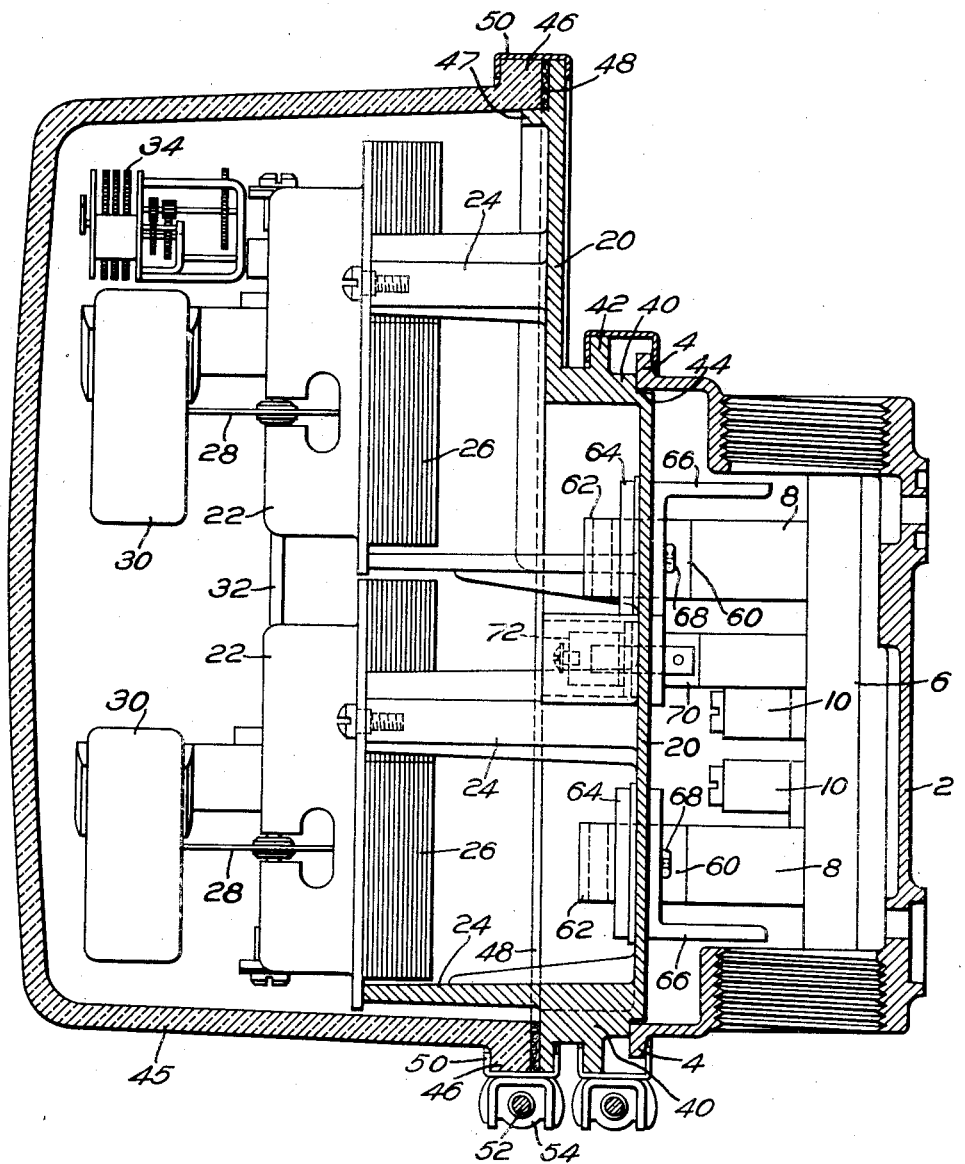

May 17, 1938.  W. G. MYLIUS  2,117,904
POLYPHASE DETACHABLE METER
Filed Nov. 21, 1935   3 Sheets-Sheet 3
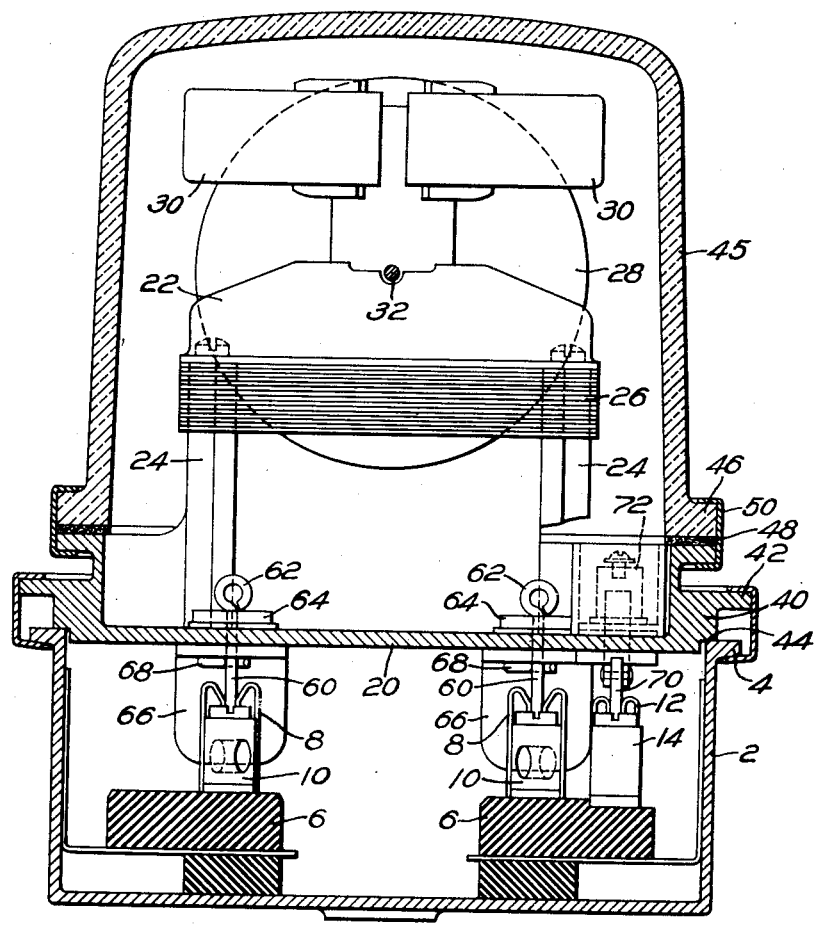
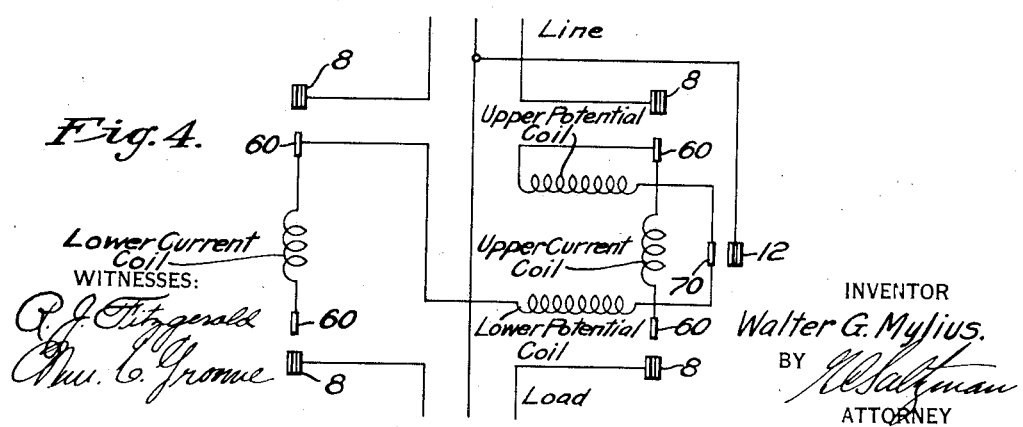
INVENTOR
Walter G. Mylius.
BY
ATTORNEY Patented May 17, 1938

2,117,904

UNITED STATES PATENT OFFICE 2,117,904

POLYPHASE DETACHABLE METER

Walter G. Mylius, Summit, N. J., assignor to Westinghouse Electric & Manufacturing Company, East Pittsburgh, Pa., a corporation of Pennsylvania Application November 21, 1935, Serial No. 50,851

2 Claims. (Cl. 247—2)

My invention relates to electrical instruments and more particularly to alternating-current watthour meters of the polyphase or multi-element type.

In view of the tendency in the art toward the detachable or so-called "plug-in" type of mounting for single-phase meters, there is an urgent demand for a mounting of this type to receive polyphase meters, which, of course, are substantially larger than the single-phase meters and usually comprise two or more meter elements mounted in vertically aligned relation for rotating a common shaft which drives a register.

Also in some cases where single-phase meters are already installed, the supply or distribution system may be changed to a polyphase system for greater operating efficiency, and it becomes necessary to install polyphase meters in place of the single-phase meters formerly in use.

It is an object of the present invention to provide a polyphase watthour meter having contacts projecting from the casing and adapted to be detachably mounted on the standard base socket or support of a detachable watthour meter.

It is a further object of the invention to provide an encased polyphase meter element which may readily be substituted for a single-phase meter of the detachable type with a minimum of change in the single-phase base or support.

In accordance with the present invention, a fifth contact jaw is mounted in the standard single-phase detachable meter base socket for receiving the fifth contact blade of a two-element polyphase meter for measuring the energy consumption of a three-phase three-wire circuit.

Referring to the drawings:

Fig. 2 is a view in vertical section on the line II—II of Fig. 1;

Fig. 3 is a view in section taken on the line III—III of Fig. 1; and

Fig. 4 is a schematic diagram of the electrical circuit connections to the windings of the meter shown in the other figures.

Figure 1:
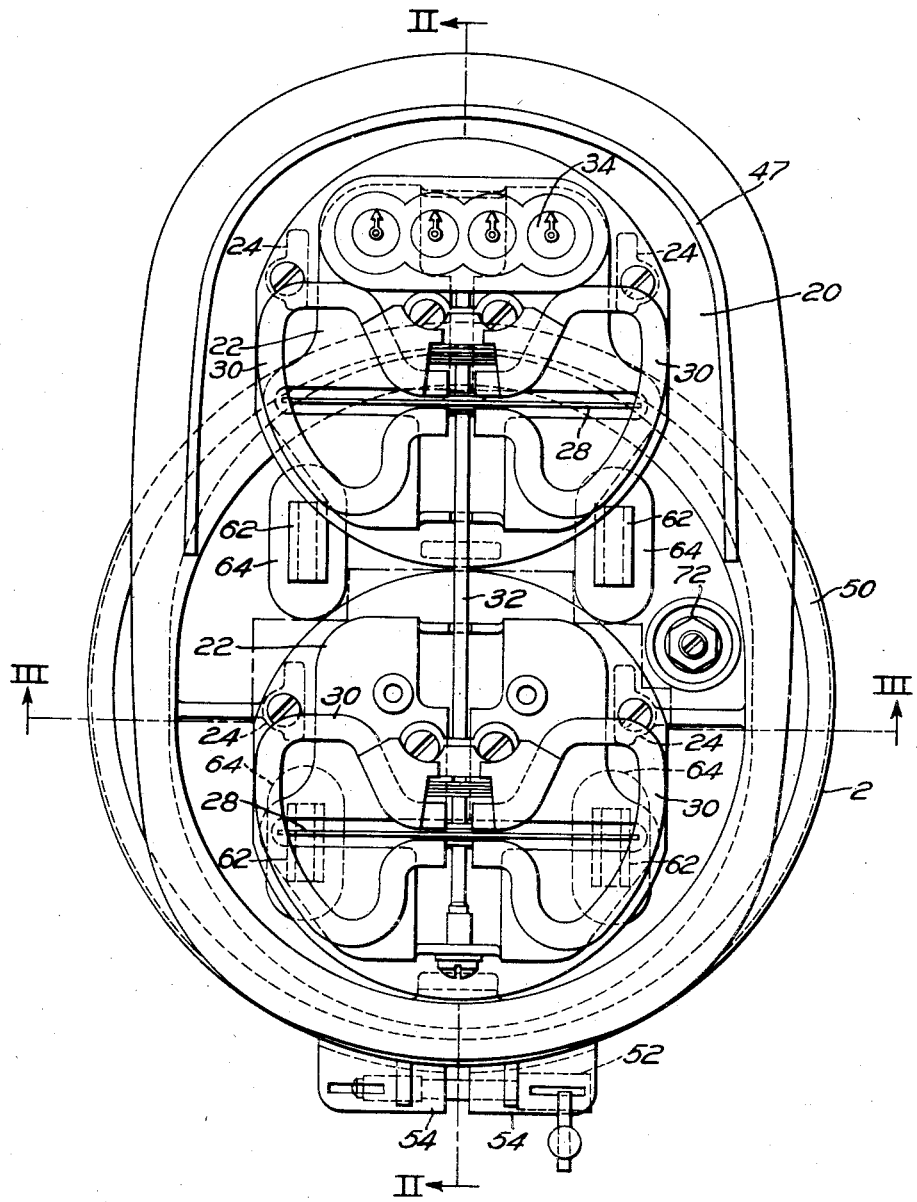
Figure 1 is a view in front elevation of a polyphase meter and its mounting in accordance with the present invention.

Referring more specifically to the drawings, the meter is to be supported upon a socket or base 2 having a circular rim 4 and encloses a pair of terminal blocks 6, each of which supports contact jaws 8 and terminals 10. The four contact jaws 8 are symmetrically disposed with reference to the axis of the receptacle 2 and are of the general character and design shown in Patent No. 1,969,499, issued August 7, 1934, to W. M. Bradshaw, et al.

The receptacle 2 with the contact assembly, including the jaws 8, is of a size and design which has been adopted as standard by the meter manufacturers in this country for single-phase twowire circuits.

In accordance with the present invention, it is desired to adapt this socket or receptacle to a polyphase meter for measuring three-phase three-wire circuits, and accordingly a fifth contact jaw 12 is mounted upon one of the existing terminal blocks 6 with its terminal 14, or, if desired, this terminal assembly may be fabricated at the factory and the entire unit substituted for one of the corresponding assemblies of a singlephase meter socket.

The five terminal jaws may then be connected into the circuit to the meter as indicated in Fig. 4. The original single-phase terminal jaws 8 may be connected to the line and load side of two of the conductors of the three-wire circuit and the added jaw 12 may be connected to the third or through conductor of the circuit.

The meter element, in accordance with the invention, comprises a base plate 20, upon the front of which is mounted two watthour meter elements 22 by means of supporting columns or posts 24, as shown. Each of the meter elements comprises a laminated electromagnet 26, a rotatable armature or disc 28, and damping permanent magnets 30. The two discs 28 are mounted on a common shaft 32 which drives a common register or integrating element 34. Each of the watthour meter elements is of standard design and no further description is considered necessary.

The rear of the base 20 is provided with a projecting circular portion 40 provided with a peripheral flange 42 and shoulder 44. The portion 40 and the shoulder 44 are proportioned to interfit with the rim of the base receptacle 2, as shown in Figs. 2 and 3.

A cover 45 of glass or other suitable material is shaped to correspond to the base portion 20 and is provided with a peripheral flange 46 of the same contour as the edge of the base portion 20. The cover may rest upon a discontinuous flange 47 projecting from the base portion, if desired. Preferably, a washer 48 of felt, cork or other suitable material may be interposed between the face of the flange 46 and the periphery of the base 20.

The glass cover 45 is secured to the base, in the present embodiment, by means of a split clamping ring 50 which embraces the flange 46 on the cover and the edge of the base 20. The ends of the ring are drawn together by means of a screw 52 engaging lugs 54 on the ends of the ring. This ring and the means for clamping it are shown and described in the aforesaid Bradshaw et al. Patent 1,969,499, and is capable of receiving a usual seal to discourage the unauthorized removal of the cover.

Four contact blades 60 project through the base portion within the area defined by the projecting circular portion and correspond to the four contact blades of the usual single-phase meter. Each blade comprises a head portion 62 within the meter casing which constitutes a terminal for the conductors (not shown) to the windings of the meter. The blades are insulated from the base by means of a bushing 64, and the projecting portions are provided with an insulating shield 66 constituting a part of the bushing. After the blades are inserted through the base, a cotter pin 68 maintains the blade and bushing assembly in operative position.

In addition to the four terminal blades 60, a fifth blade 70 is provided in the position indicated in Figs. 2 and 3. This blade is provided within the meter with a terminal screw 72, as shown more clearly in Fig. 3, and the projecting portion is adapted to be received in the added contact jaw 12 in the base receptacle 2.

A clamping ring similar in construction to the ring 50 embraces the shoulder 44 on the base 22 and the underside of the rim portion 4 of the receptacle 2. This ring is clamped into position, and may be sealed in a manner similar to that for the ring 50 above described, with all of the contact blades in contact with their respective jaws.

Referring to Fig. 4, it will be apparent that the two current coils of the polyphase meter element may be connected between pairs of contact blades 60, each to be in series with one of the circuits of the three-wire system. The potential coils of the two elements each are connected between one of the blades 60 on the line side of the meter and both extend to the added contact blade 70, the jaw 12 of which is connected to the third conductor of the three-wire system.

As shown, the fifth contact jaw 12 and the fifth contact blade 70 constitute a common potential connection to the two voltage coils. This of course may be modified by providing an additional blade and jaw associated with the other block 6 to provide for independent energization of the voltage windings if desired. Although this would be more expensive, it is sometimes advantageous for testing purposes, and is within the scope of the present invention.

It should be apparent that in accordance with the present invention I have devised a simple mounting for a polyphase meter element which may readily be substituted for an existing single-phase meter utilizing the existing base receptacle of the single-phase meter.

Quite obviously modifications may be made in the structure shown, and I desire that no limitations shall be placed upon the invention except as imposed by the appended claims.

I claim as my invention:

1. A detachable mounting for a polyphase watthour meter comprising an elongated substantially flat base and means for mounting a polyphase meter element on one side thereof, a cover for said element having a peripheral flange confronting the peripheral edge of said base, a segmental flange on said base adjacent one end thereof for engaging the inner surface of said cover, clamping means embracing the peripheral cover flange and the edge of the base, a projecting portion on the side of the base opposite to that upon which the meter element is to be mounted including a peripheral flange, a support including an aperture surrounded by a flange for confronting the last mentioned flange and means for releasably clamping said flanges together, and electrical contact means on said projecting portion and within the aperture in said support disposed to engage when such clamping means is effective.

2. A detachable mounting for a polyphase watthour meter comprising an elongated substantially flat base and means for mounting a polyphase meter element on one side thereof, a cover for said element having a peripheral flange confronting the peripheral edge of said base, a segmental flange on said base adjacent one end thereof for engaging the inner surface of said cover, clamping means embracing the peripheral cover flange and the edge of the base, a projecting portion on the side of the base opposite to that upon which the meter element is to be mounted including a peripheral flange, a support including an aperture surrounded by a flange for confronting the last mentioned flange and means for releasably clamping said flanges together, and electrical contact means on said projecting portion and within the aperture in said support disposed to engage when such clamping means is effective, said projecting portion having a peripheral groove proportioned to receive the inner peripheral edge of said support.

WALTER G. MYLIUS.